United States Patent

[11] 3,596,766

| [72] | Inventors | Donald P. Johnston;<br>Paul J. Stone; Jules Lee Magnon, all of<br>Houston, Tex. |
|---|---|---|
| [21] | Appl. No. | 811,462 |
| [22] | Filed | Mar. 28, 1969 |
| [45] | Patented | Aug. 3, 1971 |
| [73] | Assignee | National Lead Company<br>New York, N.Y. |

[54] SCALE INHIBITION
4 Claims, 4 Drawing Figs.

[52] U.S. Cl. .................................................. 210/58,
252/180, 260/233.3
[51] Int. Cl. ................................................ C02b 5/06
[50] Field of Search ............................................ 210/58;
252/180; 260/231, 233.3

[56] References Cited
UNITED STATES PATENTS

| 2,280,998 | 4/1942 | Brown | 210/58 X |
| 2,802,000 | 8/1957 | Caldwell et al. | 260/233.3 |
| 2,853,484 | 9/1958 | Lolkema et al. | 260/233.3 |
| 2,865,853 | 12/1958 | Batdorf | 210/58 X |
| 2,865,854 | 12/1958 | Sweet | 210/58 X |
| 3,001,884 | 9/1961 | Nijhoff | 260/233.3 X |
| 3,137,592 | 6/1964 | Protzman et al. | 260/233.3 X |
| 3,188,289 | 6/1965 | Kahler et al. | 210/58 |

Primary Examiner—Reuben Friedman
Assistant Examiner—Thomas G. Wyse
Attorneys—Delmar H. Larsen, Charles F. Kaegebehn and Robert L. Lehman ABSTRACT: Potato starch, with or without an admixture of cellulose, is carboxymethylated by kneading, as in a dough mixer or extruder. The product is an excellent scale inhibitor for aqueous systems, being superior to other carboxymethylated starches.

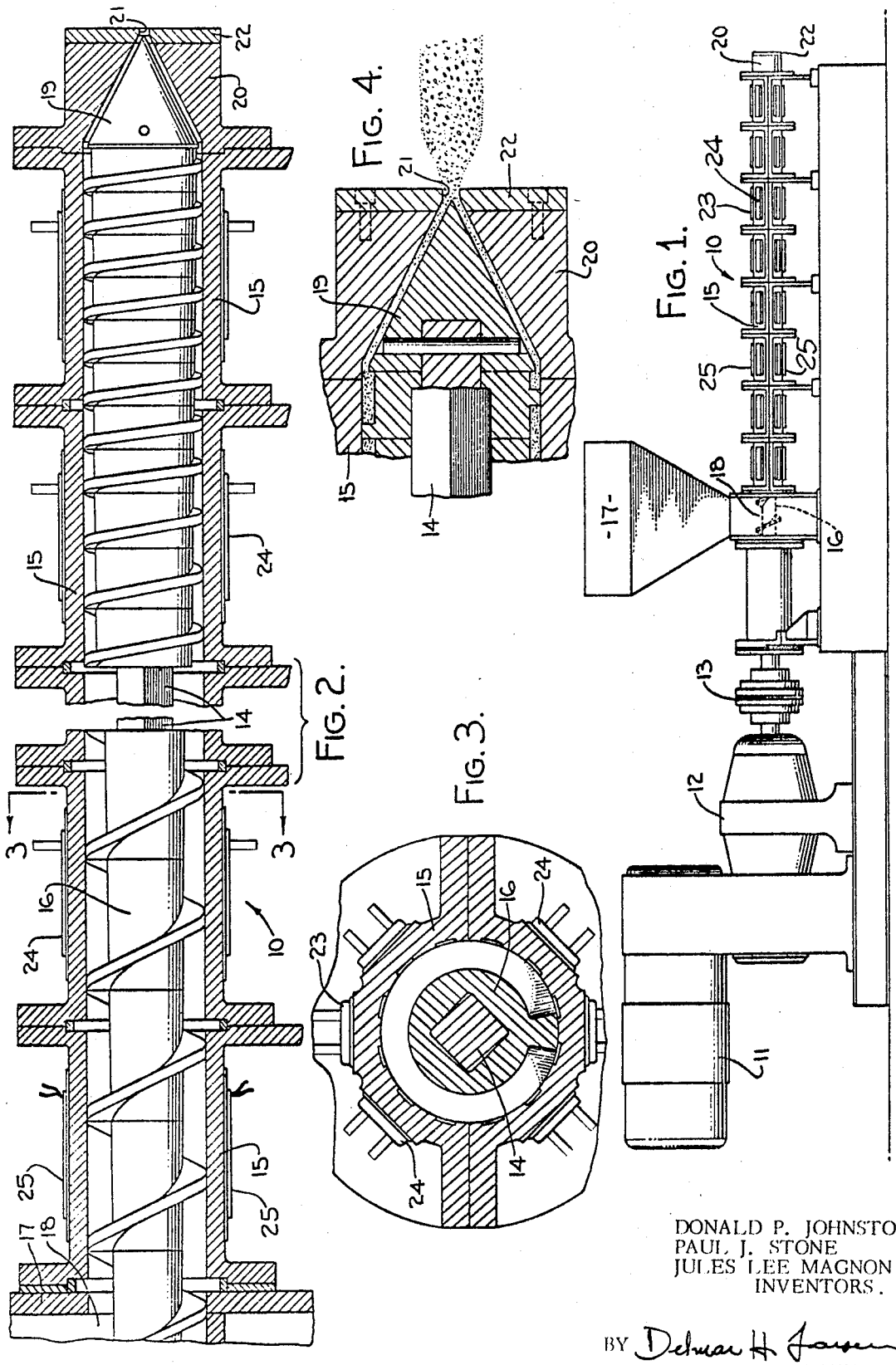

SCALE INHIBITION

This invention relates to a novel potato starch derivative having unexpectedly superior efficacy in inhibiting scale.

The deposition of scale from aqueous liquids is a widespread industrial problem. For example, where water is used for the production of steam in boilers; where it is used for heating and cooling purposes generally, for water flood operations in the secondary recovery of petroleum, in the Frasch process of sulfur mining, and the like; and where water is produced as byproduct in other operations, for example where it is produced with oil and gas in oil field production operations, the formation of scale if allowed to proceed unchecked can ultimately bring the operation involved to a halt. Such scale is generally a mixture of minerals corresponding to calcium, magnesium and iron carbonates, silicates, and sulfates, and in general tends to precipitate out on solid surfaces, as of pipes, boiler shells and tubes, valves, and the like, when the state of the aqueous liquid is modified, as by a change in temperature, pressure, or chemical composition as by the loss of carbon dioxide, for example.

Scale formation of the type described is commonly inhibited by adding to the aqueous liquid subject to such scale formation a relatively small amount of an inhibiting agent which is most commonly a water-dispersible organic colloid, with or without crystallization inhibitors such as the condensed phosphates, condensed vanadates, and similar substances. The organic colloids often used comprise tanstuffs, protein derivatives, soaps, starches and flours, plant gums and mucilages, and like materials. Most of these have some degree of effectiveness in one or more situations, but in spite of decades of research and experimentation, a pressing need still exists for a better scale inhibitor.

In the drawings,

FIG. 1 shows an elevational view of one type of suitable apparatus to produce our novel material.

FIG. 2 is a vertical section partly in elevation of the extruder portion of FIG. 1.

FIG. 3 is a sectional view taken as shown by the arrows in FIG. 2.

FIG. 4 is an enlarged detail view of the discharge end of the extruder.

An object of the present invention is to provide an improved scale inhibitor from potato starch, with or without an admixture of cellulose, said derivative being produced by carboxymethylation by a particular process.

Other objects of the invention will appear as the description thereof proceeds.

Generally speaking, and in accordance with illustrative embodiments of our invention, we place a mixture of potato starch, sodium chloroacetate, and sodium hydroxide in a kneading device. We then commence kneading the mixture, so that all of the solids in the mixture are brought into intimate contact, whereupon the temperature of the mixture rises. In any case, we provide an ultimate temperature of between about 175° F. and 320° F., which is dependent upon the degree of substitution contemplated, the intensity of the kneading action, and the length of time of kneading. After a relatively short time of kneading at the temperature mentioned, which may indeed be less than 1 minute, carboxymethylation is effected, and the product is discharged from the kneader for use.

We may use either potato starch alone, or we may use a mixture of potato starch and cellulose, preferably alpha cellulose, with from 10 percent to 100 percent potato starch and correspondingly 0 percent cellulose to 90 percent cellulose by weight. The amounts of sodium choloroacetate and sodium hydroxide used per unit weight of potato starch, or mixtures of potato starch and cellulose, are chosen with due respect to the degree of s substitution, that is the number of hydroxyl groups per glucose unit to be carboxymethylated. For a given degree of substitution, the amounts of sodium chloroacetate and sodium hydroxide are the same whether a given weight of potato starch, or the same weight of a mixture of potato starch and cellulose is used, because of the chemical similarity of starch and cellulose.

The amount of sodium chloroacetate used is in general from about one-fourth to about 1½ times the weight of the potato starch, or mixture of potato starch and cellulose. The amount of sodium hydroxide used is from about one-tenth to about one-fourth of that weight, i.e., of potato starch or potato starch-cellulose mixture. As the ratio of sodium chloroacetate to starch (or starch and cellulose) increases, the degree of substitution likewise increases, that is, the number of carboxymethyl radicals (or in accordance with a less common but more precise terminology, of glycolic acid radicals) attached by an ether linkage to each glucose residue of the polysaccharide. While a degree of substitution of 3 is in principle achievable, it is difficult to go beyond two for cellulose and almost impossible in the case of starch. For the purposes of the present invention, a degree of substitution of at least 0.25 is necessary. Larger degrees of substitution are in general wasteful. Because of excessive processing time and unnecessary consumption of sodium chloroacetate, a degree of substitution of 1.0 is a practical upper limit. The degree of substitution of any particular product in accordance with the invention can be readily determined by methods available in the literature, e.g., American Society for Testing Materials Method D-1430-65.

The proportion of sodium hydroxide used may be varied within wide limits. Some alkalinity is necessary to make the reaction proceed at all; while excessive amounts are wasteful and may bring about a degradation of the polymer. The range of proportions given above represents practical limits for convenient processing.

It will be appreciated that the mixture of reactants is a semisolid one, as distinguished from many common organic reactions which take place in solution or suspension form. Accordingly, we knead the mixture by any common mechanical means so as to bring all of the reactants in repeated, intimate contact with each other. A wide variety of apparatus is commercially available to bring about a kneading action. For small batches a dough mixer as used in the baking industry is quite suitable. For larger batches, ordinary ribbon blenders may be used. The malaxators common in the rubber and plastic industries are likewise suitable, although they in general may be overpowered for the needs involved in the present invention. We have found that an extruder, of the type commonly available and consisting of a worm-screw feed in a longitudinal housing, is especially suitable because the reaction time is greatly shortened in comparison with, for example, a dough mixer, and moreover the process can be carried out continuously, instead of batchwise. A suitable extruder is shown in the drawings, the extruder 10 being driven by a motor 11, a suitable reduction gearing 12 and a flexible coupling 13.

The extruder 10 comprises a generally cylindrical housing made up of flanged sections, of which 15 is typical. Within the housing, the square shaft 14 carries a worm screw, which is also sectional, 16 being a typical section. It will be observed from FIG. 2 that, whereas the outside diameter of the worm is constant, matching the inside diameter of the housing, the stock or shaft portion of the screw is of relatively small diameter at the input or feed end, which is at the left in FIG. 2, and tapers to a relatively large diameter at the output or right end. The free space between the stock of the worm screw and inner wall of the housing thus becomes smaller as one goes from left to right tin the section shown in FIG. 2.

At the same time, it will be observed that the pitch of the screw decreases in going from left to right, that is, from the input to the output end. When the reaction mixture is put into hopper 17, it falls down onto the worm screw at the point marked 18 at the extreme left of FIG. 2 and, when the screw is rotating, it is carried along by the screw from left to right and at the same time it is compressed.

The worm screw is terminated on its right or output end, by a conical cap 19, which fits withsmall clearance inside the final, or extruding section 20 of the housing. An opening for the material is provided by an aperture 21 in a die plate 22.

As the reaction mixture is simultaneously kneaded and conveyed horizontally along the length of the extruder, the carboxymethylation reaction takes place and being exothermic, the temperature of the mixture increases considerably. The rise in temperature is also contributed to by the mechanical energy imparted to the device, which is largely converted into heat. In general, and particularly where larger amounts of sodium chloroacetate are used in achieving a relatively higher degree of substitution, it will be necessary to cool the extruder, which may be done by passing cooling water through cooling jackets 23, 24, etc., which are attached in thermal contact to the exterior of the housing sections, as may be seen from the drawings. For the very lowest degrees of substitution, cooling may not be necessary, and in fact exemplary heating coils 25 are shown in FIG. 2, in which electricity is used to heat as distinguished from water being used to cool. At the commencement of a run, such heating is desirable. It will be appreciated that the necessity and degree of heating or cooling may be readily determined for any given reaction mixture and processing conditions by means of a trial run.

Where the processing is carried out in a dough mixer or a ribbon blender, the temperature can generally be adequately controlled by simply providing the mixer or blender with a cover or leaving it open to the ambient air, for higher or lower temperatures respectively.

The order of mixing the ingredients is relatively unimportant. Where both potato starch and cellulose are used, it is advantageous from a mechanical processing standpoint to preblend these two polysaccharides. When potato starch alone is used, it may be first mixed with the sodium chloroacetate; then caustic soda added, and kneading commenced; or the two chemicals may be added in reverse order or simultaneously. Where cellulose is present, there may be a shortening of the processing time if it is premixed with the caustic soda after blending in the potato starch.

Some illustrative examples of our invention will now be given.

EXAMPLE 1

In this example, various starches including potato starch were preblended with sodium chloroacetate with a small ribbon blender for 30 minutes, and this mixture fed to an extruder of the type already described, dry powdered sodium hydroxide being fed at the same time to the extruder. The rate of feed of the blend was 2 pounds per minute, while the caustic soda was fed at a suitable rate to give the required proportion. The temperature rise was controlled by cooling the extruder so that the exit temperature was approximately 200° F.

Different degrees of substitution were obtained by varying the proportion of sodium chloroacetate to starch and the caustic feed rate. The proportions used are given in Table I:

TABLE I

| Theoretical D.S. | Starch | Sodium Chloroacetate | NaOH | Actual D.S. |
| --- | --- | --- | --- | --- |
| D.S. 2 | 45 | 60 | 11.3 | 0.74 |
| D.S. 1 | 45 | 30 | 4.0 | 0.60 |
| D.S. 0.5 | 45 | 15 | 5.65 | 0.39 |
| D.S. 0.25 | 45 | 7.5 | 5.65 | 0.17 |
| D.S. 0 | 45 | 0 | 0 | 0 |

The "theoretical" D.S. is calculated from the proportions of sodium chloroacetate to starch in the reaction mixture. The actual D.S. achieved is shown in the last column, and was determined by the ASTM method already cited. The actual D.S. is of course the governing factor here for the purposes of the invention.

The scale-inhibiting properties of the various carboxymethylated starches, and a blank without starch, were determined by preparing 4 liters each of aqueous solutions of calcium chloride and of sodium sulfate to give 200 milliequivalents per liter of calcium sulfate when mixed in equal volumes. The solution of sodium sulfate was further treated with the inhibitor to be tested to give the concentrations shown below in the mixed solutions. The two solutions were then heated to 160° F. and forced together through a 1-foot long brass tube ⅜ inch in diameter until all 8 liters had been forced through. The brass tubes were then dried, cooled, and weighed to determine the amount of scale deposited. Results follow in Table II:

TABLE II

| Starch | Theoretical Degree of Substitution | Actual Degree of Substitution | Treatment p.p.m. | Grams Scale* |
| --- | --- | --- | --- | --- |
| Potato | 0 | 0 | 100 | 2.01±0.14 |
| Potato | 0.25 | 0.17 | 100 | 1.50±0.24 |
| Potato | 0.5 | 0.39 | 100 | 0.75±0.27 |
| Potato | 1.0 | 0.60 | 100 | 0.85±0.06 |
| Potato | 2.0 | 0.74 | 100 | 1.00±0.06 |
| Potato | 0 | 0 | 200 | 2.25±0.02 |
| Potato | 0.25 | 0.17 | 200 | 0.96±0.14 |
| Potato | 0.5 | 0.39 | 200 | 0.44±0.25 |
| Potato | 1.0 | 0.60 | 200 | 0.29±0.18 |
| Potato | 2.0 | 0.74 | 200 | 0.32±0.22 |
| Potato | 2.0 | 0.74 | 100 | 1.00±0.06 |
| Wheat | 2.0 | | 100 | 2.36±0.08 |
| Corn | 2.0 | | 100 | 1.58±0.04 |
| Tapioca | 2.0 | | 100 | 1.65±0.04 |
| Milo | 2.0 | | 100 | 1.50±0.19 |
| Potato | 2.0 | 0.74 | 200 | 0.32±0.22 |
| Wheat | 2.0 | | 200 | 1.05±0.04 |
| Corn | 2.0 | | 200 | 1.16±0.10 |
| Tapioca | 2.0 | | 200 | 0.98±0.13 |
| Milo | 2.0 | | 200 | 1.28±0.01 |
| None | 0 | 0 | 0 | 5.5 |

*Average of two determinations (The degree of substitution was determined only for the potato starch samples, but may be assumed to be very close for the other types of starches, since the processing conditions were identical).

From the results given above, it will be noted, first, that when potato starch is carboxymethylated in accordance with the invention to higher than 0.17 D.S., it reduces scale deposition from 5.5 grams to less than 1.5 grams when used at the very low concentration of 100 parts per million; and to considerably less than 1 gram when used at 200 parts per million. Second, it will be seen from Table II that potato starch, when carboxymethylated in accordance with the invention, is remarkably superior to the four other common starches tested when similarly treated. This superiority is considerable at 100 parts per million, and outstanding at 200 parts per million, giving three times as good protection against scale deposition at the latter concentration as the best of the other starches tested.

EXAMPLE 2

The use of mixed potato starch and cellulose, and kneading with a ribbon blender, is illustrated in this example. Eight pounds of potato starch and 32 pounds of alpha cellulose were placed in a ribbon blender, mixed for a few minutes, and then 16 pounds of sodium hydroxide dissolved in 26 pounds of water were added over a total time of 7 minutes. The heat of solution of sodium hydroxide brought about a final temperature of 128° C. Thirty pounds of sodium chloroacetate were then mixed in within a minute or two; kneading was continued. After 20 minutes, the temperature had risen to 140° F., so that for the next hour and a half, the doors on the ribbon blender were periodically opened and closed to keep the temperature within the range of 120° F. to 140° F. Kneading was continued for a total period of 3 hours.

The product so obtained was tested for scale inhibition properties using the method described in connection with Example I, except that the brass tubing was one-fourth inch diameter. With no inhibitor, 6.78 grams scale were formed. With the product obtained as described above, at 100 parts per million, only 0.80 grams scale were formed; while at 200 parts per million, scale formation was 0.047 grams.

EXAMPLE 3

A blend of 20 parts by weight of potato starch and 90 parts by weight of alpha cellulose was carboxymethylated in accordance with the invention by kneading in an extruder of the type described and shown in the drawings. Fifty-five parts of the mixture of potato starch and cellulose was mixed in a blender with 45 parts of sodium chloroacetate and fed continuously into the hopper of the extruder at a rate of 1,600 pounds per hour, together with 465 pounds per hour of caustic soda solution of 50 percent by weight sodium hydroxide. The average temperature just downstream of the hopper was about 160°—180° F., which increased to the exit end of the extruder to about 280°—320° F. The average residence time of the mixture within the extruder was estimated to be between 40 and 60 seconds.

The product so obtained, when tested as set forth in Example 3 at 200 parts per million, reduced the scale deposition to less than 10 percent of the value obtained when the inhibitor was not present, thus showing excellent scale inhibition properties.

We have illustrated our invention with numerous specific examples. However, we wish it to be understood that we do not desire to be limited to the exact details of procedure shown and described, for obvious modifications will occur to a person skilled in the art.

We claim:

1. The process of inhibiting the deposition of scale from aqueous liquids containing substances having a tendency to precipitate out as scale which comprises the step of adding to said liquids, in an amount sufficient to substantially inhibit said scale formation, the product obtainable in accordance with the process of preparing a potato starch derivative having enhanced scale-inhibiting properties which comprises the steps of kneading a mixture of potato starch, from one-quarter to 1½ times the weight of said potato starch of sodium chloroacetate and from about one-tenth to about one-quarter of the weight of said potato starch of sodium hydroxide, at a temperature of between about 175° F. and about 320° F., until carboxymethylation of said starch is substantially completed; and recovering the product so obtained.

2. The process in accordance with claim 1 wherein said kneading is accomplished by extrusion.

3. The process of inhibiting the deposition of scale from aqueous liquids containing substances having a tendency to precipitate out as scale which comprises the step of adding to said liquid, in an amount sufficient to substantially inhibit said scale formation, the product obtainable in accordance with the process of preparing a potato starch and cellulose derivative having enhanced scale-inhibiting properties which comprises the steps of kneading a mixture of cellulose and potato starch containing at least 10 percent by weight of said potato starch, together with from one-quarter to 1½ times the weight of said cellulose-potato starch mixture of sodium chloroacetate and from about one-tenth to about one-quarter of the weight of said cellulose-potato starch mixture of sodium hydroxide, at a temperature of between 175° F. and about 320° F., until carboxymethylation of said cellulose-potato starch mixture is substantially complete; and recovering the product so obtained.

4. The process in accordance with claim 3 wherein said kneading is accomplished by extrusion.